United States Patent [19]

Jackson

[11] 4,094,216

[45] June 13, 1978

[54] RAPIDLY ADJUSTABLE TOOL

[76] Inventor: Carl D. Jackson, 102 E. Falcon Run, Pendleton, Ind. 46064

[21] Appl. No.: 774,333

[22] Filed: Mar. 4, 1977

[51] Int. Cl.² .............................................. B25B 13/16
[52] U.S. Cl. ............................................ 81/156; 81/175
[58] Field of Search .......................... 81/156, 165, 175; 269/173, 174; 74/424.8 A

[56] References Cited

U.S. PATENT DOCUMENTS

| | | | |
|---|---|---|---|
| 823,166 | 6/1906 | Glouer | 81/156 |
| 1,036,300 | 8/1912 | Miller | 81/156 |
| 1,905,569 | 4/1933 | Rapellin | 74/424.8 A |
| 2,001,057 | 5/1935 | Fellay | 74/424.8 A |
| 2,393,764 | 1/1946 | Frank | 269/174 X |
| 2,491,543 | 12/1949 | Alfonso | 74/424.8 A |
| 2,648,244 | 8/1953 | Alemany | 81/165 X |

*Primary Examiner*—N. P. Godici
*Attorney, Agent, or Firm*—Wegner, Stellman, McCord, Wiles & Wood

[57] ABSTRACT

An adjustable tool including at least two tool parts, each having a work engaging surface, the parts being interconnected such that the work engaging surfaces are relatively movable, an elongated rotary and reciprocal, threaded actuator operatively associated with a part such that upon rotation or reciprocation of the actuator, relative movement between the parts will occur, a tool base mounting the parts in the actuator and a clutch on the base and receiving the actuator for selectively engaging or disengaging the threads on the actuator, the actuator being substantially freely reciprocal within the base when the threads are disengaged to allow rapid relative movement between the work engaging surfaces to occur to effect rapid adjustment of the relative position of the surfaces, the actuator being rotatable when the threads are engaged to effect fine adjustment and/or the application of clamping force by the work engaging surfaces. Also disclosed is an improved clutch construction.

7 Claims, 6 Drawing Figures

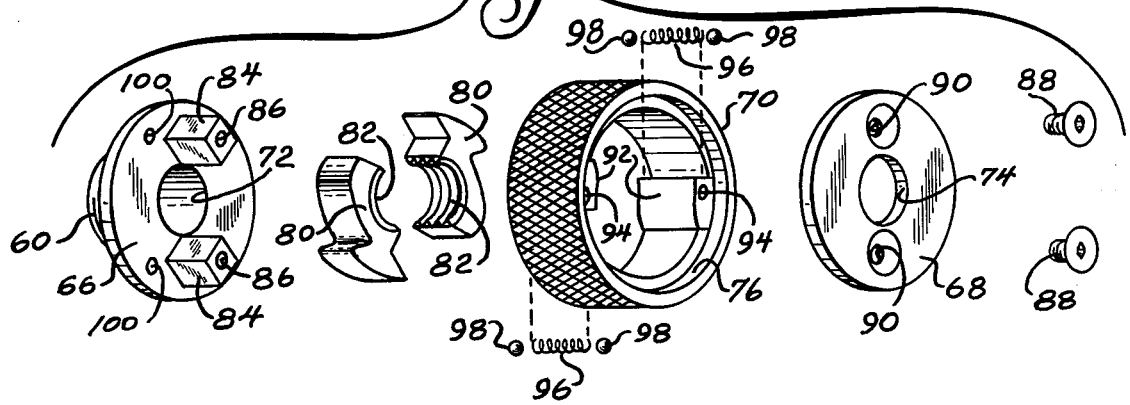
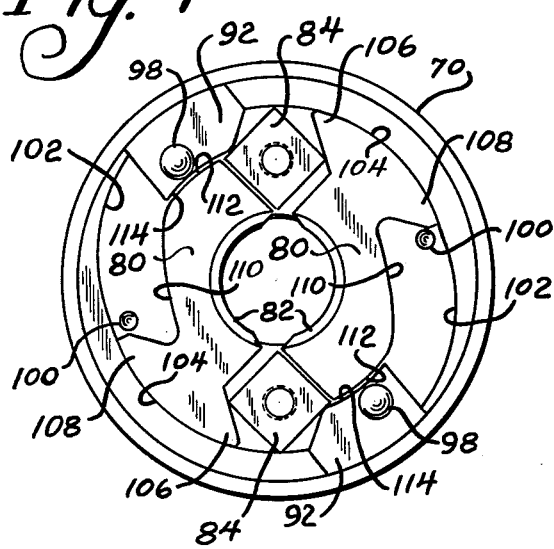
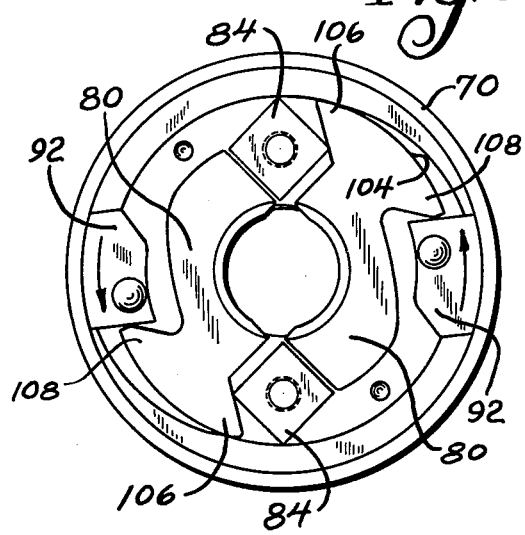
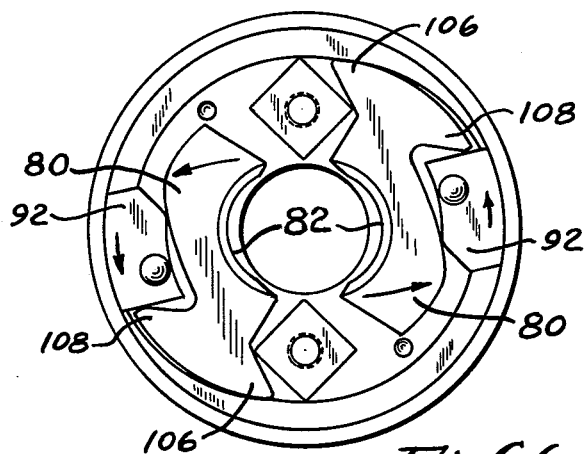

RAPIDLY ADJUSTABLE TOOL

BACKGROUND OF THE INVENTION

This invention relates to the provision of a rapidly adjustable tool and to the provision of a new and improved clutch construction particularly suited for, but not limited to, use in such a tool.

A variety of tools, generally of the hand-held variety, utilize rotary threaded actuators for causing relative movement between two or more work engaging surfaces to adjust the tool to varying sizes of work pieces and/or apply clamping force to a work piece. Typical of such tools are so-called "monkey wrenches" wherein a worm is rotated to advance one of the wrench jaws with respect to the other; clamping pliers-like tools, such as that marketed under the trademark VISE-GRIP ®, wherein the travel of clamping jaws is set by the axial position of a rotary threaded member, a variety of clamps wherein one or more surfaces is advanced towards another surface through rotation of a threaded member; tube cutters wherein a rotatable circular blade is advanced towards tube engaging rollers by rotation of a threaded member; and the like. Numerous other examples will occur to those skilled in the art.

Common to each such tool is the movement of one work engaging surface toward or away from another for the purpose of adjusting the relative position of the surfaces to accommodate differing sizes of work pieces as, for example, differing sizes of bolt heads or nuts or for the combined purpose of adjusting the relative positions of the surfaces to accommodate varying sizes of work pieces and for thereafter and/or simultaneously applying a clamping force as in the case of clamps or tube cutters.

Typically, the rate of axial advancement or retraction of one surface relative the other is quite slow due to the fact that it is obtained through rotation of a threaded member. When adjusting the tool from a relatively small work piece to a relatively large work piece, or vice versa, considerable time may be expended in achieving sufficient axial advancement or retraction to fit the new work piece.

SUMMARY OF THE INVENTION

It is the principal object of the invention to provide a new and improved, rapidly adjustable tool wherein relatively movable work surfaces may be rapidly positioned with respect to each other. It is also a major object of the invention to provide a new and improved clutch assembly for selectively engaging or disengaging the thread on an elongated, rotary and reciprocable actuator.

An exemplary embodiment of a tool made according to the invention includes first and second relatively movable parts each having a work engaging surface. The work engaging surfaces are cooperable with each other to simultaneously engage a work piece. Means are provided which connect the parts for relative movement of the work engaging surfaces so they may be brought into engagement with a work piece. A rotary threaded actuator is carried by the tool and is axially movable thereon. Means interconnect the actuator and at least one of the parts such that axial movement of the actuator will control the positioning of the surfaces and there is included a clutch on the tool for selectively engaging or disengaging the threads on the actuator to allow fine or rapid axial adjustment, respectively, of the actuator.

The actuator is typically substantially freely reciprocable within the tool when the threads are disengaged to allow rapid relative movement between the surfaces to occur to effect rapid adjustment of the relative position of the surfaces. The actuator is also rotatable when the threads are engaged to effect fine adjustment of the position and/or the application of clamping force by the surfaces.

In a preferred embodiment of the invention, the clutch includes radially movable split nuts surrounding the actuator. In a highly preferred embodiment, the clutch comprises a housing surrounding the actuator and the housing includes a first component secured to the tool and a second component rotatable on the first component. The split nuts are received within the housing and cam means are carried by the housing and the split nut for effecting radial movement of the split nuts within the housing upon relative rotary movement between the housing components.

A preferred clutch construction made according to the invention includes a housing having an opening extending therethrough for rotary and reciprocating receipt of an elongated threaded shaft. The housing includes spaced end walls and a peripheral wall rotatably received on the end walls. Attaching means are located on one of the end walls whereby the housing may be secured to other structure. At least two split nuts are contained within the housing and each has a radially inner, concave threaded surface and radially outer cam surfaces. Cam means are carried by the peripheral wall for engaging the cam surfaces on the split nuts when the peripheral wall is rotated and for positively moving the split nut radially inwardly. Means are provided for moving the split nuts radially outwardly.

The peripheral wall includes an interior surface with at least two partially spiral portions, one for each split nut and the cam surfaces comprise circumferentially extending, opposed dogs on each split nut and release therein oppositely from the concave threaded surfaces. The cam means comprise at least two axially extending stops on an end wall of the housing and at least two radially inwardly directed stops on the interior surface of the peripheral wall.

In an exemplary embodiment of the invention, at least one of the radially extending stops includes an axially extending bore which receives at least one spring-loaded ball. A detent recess for receiving the ball is located in one of the end walls.

Other objects and advantages will become apparent from the following specification taken in connection with the accompanying drawings.

DESCRIPTION OF THE DRAWINGS

FIG. 3 is a perspective, exploded view of a clutch made according to the invention;

FIG. 4 is a plan view of the clutch with an end wall removed showing the relative configuration of the components when the clutch is to be engaged with the threaded shaft;

FIG. 5 is a view similar to FIG. 4 illustrating configuration of the components just prior to disengagement of the clutch; and FIG. 6 is a view similar to FIGS. 4 and 5, illustrating the configuration of the components when the clutch has been fully disengaged.

DESCRIPTION OF THE PREFERRED EMBODIMENT

Figure 1:
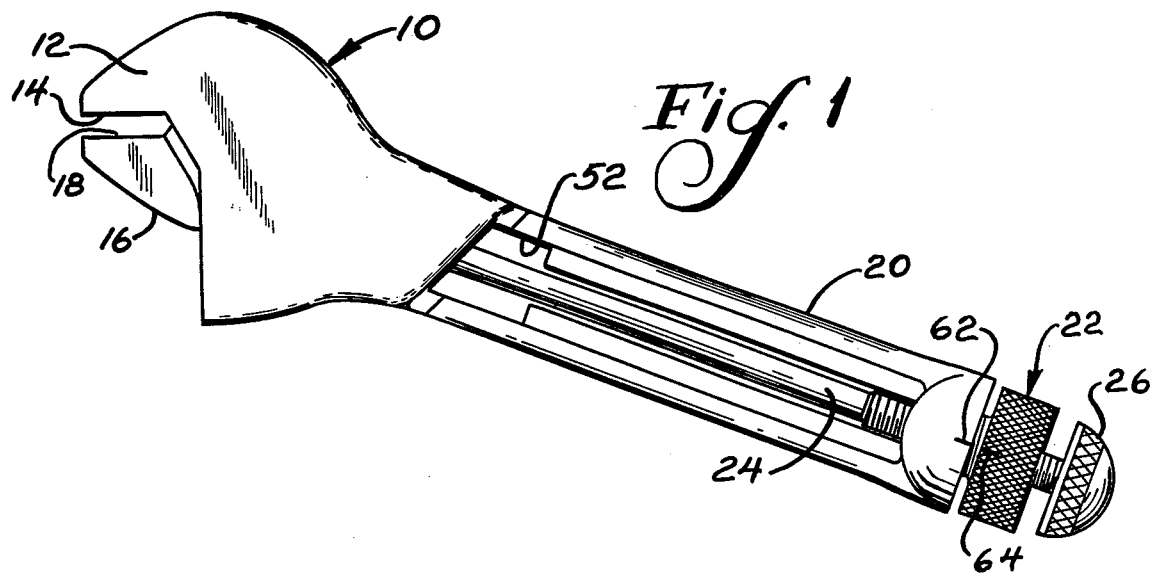
FIG. 1 is a plan view of a tool, specifically a wrench, embodying the invention.
Figure 2:
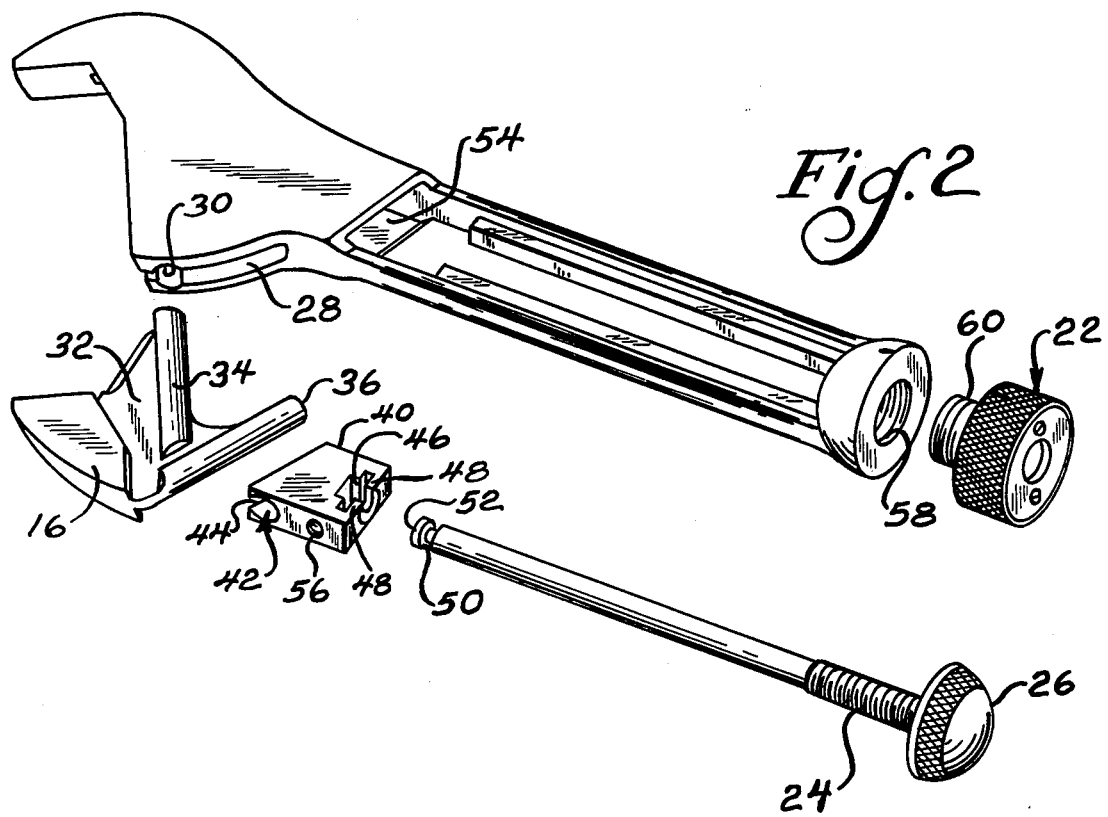
FIG. 2 is a perspective, exploded view of the tool.

An exemplary embodiment of a tool made according to the invention is illustrated in FIGS. 1 and 2 in the form of an adjustable wrench. However, as alluded to previously, the invention may be advantageously employed in other tools such as clamping-type pliers, tube cutters, clamps, and virtually any other type of tool wherein there are relatively moving parts each having a work engaging surface, movement of which, or the positioning of which is effected or controlled by rotation of a threaded member. The illustrated wrench includes a head, generally designated 10, including a first part 12 having a work engaging surface 14 for engaging one flat on a nut, a bolt head or the like. A second part 16 is movable relative to the first part 12 and includes a work engaging surface 18 movable towards and away from the surface 14, and also for the purpose of engaging the flat of a nut or a bolt head or the like.

Integral with the first part 12 is a handle 20 which serves as a base for the relatively movable surfaces 14 and 18 and which mounts a split nut type clutch, generally designated 22, the details of which will be described in greater detail hereinafter. An elongated threaded shaft 24 extends through the clutch 22 and includes a handle 26 remote from the head 10.

As best seen in FIG. 2, the first tool part 12 includes a slot 28 provided adjacent the left-hand end with an enlarged, cylindrical guide bore 30. The second tool part 16 includes a web 32 receivable within the slot 28. A cylindrical guide formation 34 is carried by the web for receipt within the bore 30 so that the parts 12 and 16 are relatively movable. The web 32 also mounts an angularly extending cylindrical guide formation 36 of lesser diameter than the guide formation 34 and sized to be receivable within the slot 28. A cam block 40 which is trapezoidal in configuration includes an angularly disposed guide bore 42 for receipt of the guide formation 36 and which opens along its length in a slot 44 sufficiently wide to receive the web 32. At the opposite end of the cam block 40, there is provided a recess 46 opening to an end of the block. Inwardly directed tongues 48 partially close the recess 46. The threaded actuator 24, at its end opposite the handle 26, includes a peripheral groove 50 which defines a cap 52 on the end of the threaded actuator 24 which is receivable within the recess 46 and which is captured therein allowing rotation of the actuator 24 relative to the block 40 but securing the two together for mutual reciprocatory movement along the longitudinal axis of the actuator 24.

As seen in FIG. 1, the handle 20 is cut out in the vicinity 52 to allow the block 40 to be disposed therein to enter a hollow area 54 (FIG. 2) within the head 10, which hollow area 54 extends to the slot 28. The hollow area 54 is sized to guide the block 40 in the direction axial of the threaded actuator 24.

In the course of assembling the tool, the block 40 is disposed within the opening 52 and the threaded shaft or actuator 24 introduced through the clutch 22. The head 52 is captured in the recess 46 and the block 40 axially shifted into the hollow area 54. At some point in such movement, the cylindrical bores 30 and 42 will be aligned with the guide formations 34 and 36, respectively, so that the latter may be received in the former.

A set screw 56 may then be inserted through the slot 60 into a tapped bore in the block 40 to prevent axial movement of the block 40 to the right, as viewed in the drawing, sufficiently to allow the cap 52 to exit the recess 46. Axial movement of the threaded actuator 24 to the left, as viewed in the Figure, will cause the surfaces 14 and 18 on the parts 12 and 16 to move towards each other while axial movement to the right until the set screw 56 abuts the right-hand end of the slot 26, as viewed in FIGS. 1 and 2, will cause the surfaces 14 and 18 to separate due to the camming action of the block 40 on the guide surfaces 36 and the restraint against movement of the part 16 to the left provided by the guide formation 34 and the bore 30.

When the clutch 22 is disengaged, the threaded actuator 24 may be relatively freely reciprocated to rapidly effect axial movement in either direction. Such free reciprocation allows for rapid adjustment of the relative positions of the surfaces 14 and 18. Once rapid adjustment has been attained, the clutch 22 may be engaged and the handle 26 rotated to cause further axial advancement or retraction of the actuator 24 by engagement of the threads thereon with the interior components of the clutch 22.

Preferably, the end of the handle 20 includes an enlarged threaded bore 58 for receipt of the threaded end 60 of the clutch 22 whereby the clutch 22 may be mounted on the tool. Additionally, since as will be seen, the clutch 22 includes components movable with respect to the tool, index marks 62 and 64 may be disposed on the tool and the clutch 22 respectively to provide a visual indication that the clutch 22 is engaged (or disengaged, if that is desired).

Turning now to FIG. 3, the clutch 22 includes a housing defined by first and second end pieces 66 and 68 and a ring-like peripheral wall 70. The end piece 66 has integrally formed thereon the threaded section 60 by which the clutch 22 is attached to the tool. The end pieces 66 and 68 have centrally located openings 72 and 74 in which the threaded actuator 24 extends. The openings 72 and 74 are preferably sized so as to provide the aforementioned free reciprocation of the actuator 24. The peripheral wall or ring 70 includes annular recess 76 (only one of which is shown) on both sides thereof for receipt on the cylindrical periphery of the end walls 66 and 68 such that the peripheral wall 70 is rotatable with respect to the end walls.

Received within the housing are opposed split nuts 80 each having a concave threaded surface 82. The split nuts 80 are movable radially inwardly and outwardly within the housing. When moved to their radially innermost position, the threaded surfaces 82 engage the threads on the actuator 24 to engage the clutch so that axial movement of the actuator can only occur through rotation thereof by means of the handle 26. Conversely, when the split nuts 80 are moved to their radially outer position, the threaded surfaces 82 thereof will be free from the threads on the threaded actuator 24, allowing the same to be freely reciprocated through the openings 72 and 74 in the end walls 66 and 68, respectively.

The end wall 66 mounts two axially extending stops 84 disposed on opposite sides of the opening 72 and which act as part of a cam means for effecting the aforementioned radial movement of the split nut 80. Each of the stops 84 includes an axially extended threaded bore 86 for receipt of threaded fasteners 88 which may extend through countersunk bores 90 in the end wall 68 for the purpose of securing the components in assembled relationship.

The peripheral wall 70 includes radially inwardly directed stops 92 which also act as part of a cam means for effecting the aforementioned radial movement of the split nut 80 and each of which has an axially extending bore 94 therein. Each of the bores 94 receives a coiled spring 96 sandwiched by two detent defining balls 98. The spring 96 urges the balls 98 oppositely out of opposite ends of the bores 94 so that they may be received in semi-spherical recesses 100 on the inner faces of the end walls 66 and 68, the bores 100 in the end wall 66 only being illustrated.

More particularly, it will be recalled that the peripheral wall 70 is rotatable with respect to the end walls and naturally will carry the stops 92 and thus the spring-loaded balls 98 therewith. The recesses 100 appropriately are located so as to receive the balls 98 and provide a detent action at desired positions of relative rotation of the peripheral wall 70 with respect to the end walls. Specifically, the recesses 100 will be located so as to provide a detenting action at positions of the peripheral wall 70 corresponding to either full disengagement of the clutch, full engagement of the clutch, or both.

Turning now to FIGS. 4–6, inclusive, and with particular attention initially to FIG. 4, it will be seen that the interior surface of the peripheral wall 70 includes opposed, partially spiralled surfaces 102 which spiral radially outwardly in a clockwise direction. Each of the split nuts 80 includes a radially outer surface 104 having approximately the same curvature as the interior surface of the peripheral wall. Projecting oppositely, and adjacent to the radial surfaces 104 of each of the split nuts 80 are circumferentially extending dogs 106 and 108. Intermediate the ends of each split nut 80 and on the side thereof opposite from the concave threaded surface 82 is a relief 110. The surface of each split nut 80 adjacent the end thereof remote from the dogs 106 and 108 extends radially outwardly a greater distance than the surface of the relief 110 and is designated 112.

The radially inner surface of each of the stops 92 carried by the ring 70 is concave, as illustrated at 114, and has a curvature complementary to the surface 112 of the corresponding split nut 80. Finally, each of the stops 84 carried by the end wall 66 is generally square in cross section.

FIG. 4 illustrates the configuration of the components when the peripheral wall 70 has been rotated on the end walls 66 and 68 to a position commanding full engagement of the split nuts 80 with the threaded actuator 24, the latter not being shown in FIGS. 4–6, inclusive. In other words, the split nuts 80 are at their radially innermost position. It will be noted that the split nuts 80 are positively held in such a position by the backing provided by the radially inner surfaces 114 of the stops 92 and the radially inner portions of the spiral interior wall 102 of the peripheral wall 70 as they bear against the curved surfaces 104 of the split nut 83.

To disengage the clutch, as viewed in FIG. 5, the peripheral wall 70 is rotated in a counterclockwise direction. At some point in time, the stops 92 carried by the peripheral wall 70 will engage the dogs 108 on respective ones of the split nuts 80. At the same time, the radially inner surfaces of the dogs 106 will be brought into firm engagement with one of the corners of the corresponding stops 84. At the same time, rotation of the peripheral wall 70 will have brought the radially outer portions of the partial spiral interior walls 102 into alignment with the surfaces 104, as seen in FIG. 5.

Further rotation of the peripheral wall 70 will cause the components to assume the configuration illustrated in FIG. 6. In particular, the pinching effect of the stops 92 and 84 on the dogs 106 and 108 will cause the split nuts 80 to be cammed radially outwardly, such movement being accommodated by the radially outer portions of the partial spiralled interior walls 102 of the peripheral wall 70. Such radially outward movement is also accommodated by the provision of the relief 110 which receives the radially inner surfaces of the stop 92.

To effect engagement of the clutch by moving the split nuts 80 radially inwardly, it is only necessary to rotate the peripheral wall 70 in a clockwise direction. During such rotation, the radially inner surfaces 114 of the stops 92 will slide out of the reliefs 110 and onto the surfaces 112 of the split nuts 80. Because of the fact that the surfaces 112 are located radially outwardly of the reliefs 110, the split nuts will be cammed radially inwardly. Such radial inward movement is also accommodated by the fact that as the wall 70 is rotated in a clockwise direction, the radially inner portion of the partial spiralled wall 102 will bear against the surfaces 104 of the split nut and force the same radially inwardly. Of course, during such movement, between detent positions, the balls 98 will be cammed into the bores 94 until such time as they align with one of the recesses 100 to provide a detent function.

I claim:

1. An adjustable tool comprising:
at least two tool parts, each having a work engaging surface,
said parts being interconnected such that said work engaging surfaces are relatively movable;
an elongated rotary and reciprocal, threaded actuator operatively associated with said parts such that upon rotation or reciprocation of said actuator, relative movement between said parts will occur;
a tool base, mounting said parts and said actuator; and
a clutch on said base and receiving said actuator for selectively engaging or disengaging the threads on said actuator, said actuator being substantially freely reciprocable within said base when said threads are disengaged to allow rapid relative movement between said surfaces to occur to effect rapid adjustment of the relative positions of said surfaces, said actuator being rotatable when said threads are engaged to effect fine adjustment or and/or the application of clamping force by said surfaces, said clutch comprising a housing surrounding said actuator, said housing including a first component secured to said base and a second component rotatable on said first component, a pair of split nuts generally radially movable within said housing and about said actuator, and cam means on said housing and said split nuts for effecting bidirectional radial movement of said split nuts within said housing upon relative rotary movement between said components.

2. The tool of claim 1 further including detent means interposed between said components.

3. The tool of claim 1 further including means on said second component for limiting outward radial movement of said split nuts in all positions of relative rotation of said first and second components.

4. The tool of claim 3 wherein said limiting means comprise spiralled surfaces engageable by the radially outer surface of a corresponding one of said split nuts.

5. The tool of claim 1 wherein said cam means includes opposed, generally circumferentially extending dogs on each split nut and first and second stops respectively on said first and second components engageable with said dogs on opposite sides of each split nut and movable towards and away from each other camming said split nuts radially outwardly.

6. A tool comprising first and relatively movable parts each having a work engaging surface said work engaging surfaces being cooperable to simultaneously engage a work piece;
- means connecting said parts for relative movement of said work engaging surfaces, so that they may be brought into engagement with a work piece;
- a rotary threaded actuator carried by said tool and axially movable thereon;
- means interconnecting said actuator and at least one of said parts such that axial movement of said actuator will control the positioning of said surfaces;
- a clutch on said tool for selectively engaging or disengaging the threads on said actuator to allow fine or rapid axial adjustment, respectively, of said actuator, said clutch including at least one movable element having a concave threaded surface for selective engagement or disengagement with said threaded actuator;
- a housing containing said element and said actuator extends through said housing;
- a ring like operator carried by said housing and rotatable thereof for moving said element, said ring having a partially spiralled interior surface confronting said element remote from said concave threaded surface; and
- cam means on said ring, said element and said housing for selectively moving said element into engagement with the radially outer or radial inner portions of said partially spiralled interior surface, said cam means comprising opposed, circumferentially extending dogs on the radially outer part of said element, and first and second stops, one on said housing and the other on the interior of said ring, for engagement with a respective one of said dogs.

7. The tool of claim 6 wherein the stop on said ring includes an axial bore and further including a spring biased ball in said bore, and a detent recess in said housing for receiving said ball in one position of said ring with respect to said housing.

* * * * *